United States Patent
Kurosawa et al.

(10) Patent No.: US 6,498,709 B2
(45) Date of Patent: Dec. 24, 2002

(54) DIGITAL DISTANCE RELAY

(75) Inventors: Yasuhiro Kurosawa, Tokyo (JP); Tetsuo Matsushima, Tokyo (JP); Hidenari Amo, Tokyo (JP); Hiroshi Saito, Saitama-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/891,294

(22) Filed: Jun. 27, 2001

(65) Prior Publication Data

US 2002/0012213 A1 Jan. 31, 2002

(30) Foreign Application Priority Data

Jun. 28, 2000 (JP) ........................................ 2000-194556

(51) Int. Cl.[7] ................................................. H02H 3/18
(52) U.S. Cl. ........................................ 361/80; 324/525
(58) Field of Search .............................. 361/66, 80, 69, 361/81, 82, 84; 702/57, 58, 59; 324/512, 522, 525

(56) References Cited

U.S. PATENT DOCUMENTS

| | | | |
|---|---|---|---|
| 4,371,908 A | * 2/1983 | Andow et al. | 361/68 |
| 4,507,700 A | * 3/1985 | Andow et al. | 361/80 |
| 4,785,249 A | * 11/1988 | Yoshida | 324/509 |
| 4,864,453 A | * 9/1989 | Bergman et al. | 324/107 |

* cited by examiner

Primary Examiner—Shawn Riley
(74) Attorney, Agent, or Firm—Oblon, Spivak, McClelland, Maier & Neustadt, P.C.

(57) ABSTRACT

A digital distance relay for deciding whether a fault point is within a stipulated operation region by obtaining an impedance to the fault point. The relay comprises: means for deciding whether the impedance is within a specified region by applying a value proportional to the relative phase; and means for deciding the fault point is within the stipulated operation region if: (a) when the load current indicates a sending direction, the positive-phase resistance and reactance are within a stipulated region based on stipulated positive-phase resistance and reactance, and the impedance is decided within the specified region; or (b) when the load current indicates a receiving direction, the positive-phase resistance and reactance are within a stipulated region based on stipulated positive-phase resistance and reactance, or the impedance is decided within the specified region.

12 Claims, 11 Drawing Sheets

[Receiving Direction]

Time "M" = 1 Cycle prior to Time "m"

[Sending Direction]

DIGITAL DISTANCE RELAY

FIELD OF THE INVENTION

This invention is related to a digital distance relay for measuring impedance up to the point of the fault with a fault point resistance in an AC power supply system with load current.

BACKGROUND OF THE INVENTION

Impedance of the distance relay in the prior art is set by estimating impedance measurement errors arising from fault with resistance of fault point in a power supply system with load current. At a sending terminal, tendency of so called "over-reach" is seen where reactance component of the impedance is seen smaller than actual value. At a receiving terminal, tendency of so called "under-reach" is seen where reactance component of the impedance is seen larger than actual value.

However, terminals where a distance relay is set are not fixed to the sending side or the receiving side, and impedance is usually set considering maximum of the error that can be generated under estimated system conditions.

FIG. 1 shows a digital distance relay 10 set in a power supply system. As shown in FIG. 1, the digital distance relay 10 receives total current "I+IL" of load current IL and fault current "I" from a transmission line 1 via a current transformer 2, and voltage V transformed to an appropriate level via a voltage transformer 3. The voltage V consists of a voltage drop component "R+jX" due to the impedance of the transmission line and fault point voltage VF due to fault current I/C (wherein C is a current division ratio of the fault current) through the fault point resistance RA at the fault point F, as shown in Equation (1) below:

$$V = R \cdot (I+IL) + jX \cdot (I+IL) + VF \quad (1)$$

where $VF = RA \cdot I/C$, and "j" is an imaginary unit of complex numbers. In Equation (1), the fault point voltage VF is a cause of error in impedance measurement of distance relays.

Equation (1) can be transformed to Equation (2) shown below:

$$V/(I+IL) = Zry \quad (2)$$
$$= R + jX + \underline{(RA/C)/(1+IL/I)}$$

because:

$$ZF = \underline{(RA/C)/(1+IL/I)}$$
$$= rf + jxf$$

The impedance of the underlined part of Equation (2) results in impedance measurement error as shown in FIG. 2.

In FIG. 2, FB corresponds to RA/C in Equation (2), and FA corresponds to the fault impedance seen from the relay corresponding to the underlined part of Equation (2).

The ratio of the magnitudes of FA and AB is |IL/I|, and the phase difference δ between FA and FB shows advanced phase of the load current relative to the fault current I. When the magnitude |IL/I| is changed with a constant phase difference δ, the trace of the impedance Zry seen from the relay becomes a circle as shown in FIG. 2. This circle is a trace of the point A where the circumference angle ∠FAB viewing a chord FB (=RA/C) is a constant of ∠FAB=π−δ.

The resistance component rf and the reactance component xf of the measurement error of the impedance seen from the relay are calculated as follows:

Equation (1) is multiplied by (I+IL)*, which is a conjugate complex number of the current (I+IL) which is applied when the impedance is measured with the relay, and then the real and imaginary parts of both side are respectively equalized as shown in Equations (3) and (4) as follows:

$$Re[V \cdot (I+IL)^*] = R \cdot |I+IL|^2 + Re[VF \cdot (I+IL)^*]$$

$$Re[Zry] = R + Re[VF \cdot (I+IL)^*]/|I+IL|^2 \quad (3)$$

$$Im[V \cdot (I+IL)^*] = X \cdot |I+IL|^2 + Im[VF \cdot (I+IL)^*]$$

$$Im[Zry] = X + Im[VF \cdot (I+IL)^*]/|I+IL|^2 \quad (4)$$

The underlined parts of Equations (3) and (4) are the impedance measurement error "rf+jxf".

Mathematically in general, Vectors A and B have the following relations:

$$[A \cdot B^*] = |A| \cdot |B| \cdot \exp(j(\theta))$$

$$Im[A \cdot B^*] = |A| \cdot |B| \cdot \sin(\theta)$$

$$Re[A \cdot B^*] = |A| \cdot |B| \cdot \cos(\theta)$$

wherein "*" denotes conjugate complex number, θ(=θA−θB) is an advanced phase of Vector A relative to Vector B. Considering the mathematics described above, Equations (3) and (4) show that, when the fault point voltage VF is delayed relative to the current "I+IL" which is used for impedance measurement of the relay, xf becomes negative, and the reactance Xry measured by the relay becomes smaller than the actual reactance X up to the fault point, which is an "over-reach" state. On the other hand, when the fault point voltage VF is advanced relative to the current "I+IL", xf becomes positive, and the reactance measured by the relay becomes larger than the actual line reactance, which is an "under-reach" state.

From the explanation above, it is understood that the measurement error of the digital distance relay for measuring the impedance up to the fault point changes much depending the direction and magnitude of the load current, in case of a fault with a load current and with a fault resistance. However, in the prior art, the digital distance relay is set considering maximum measurement error calculated based on the condition of the power supply system and the estimated magnitude of the fault point resistance.

SUMMARY OF THE INVENTION

Accordingly, it is an objective of the present invention to provide a digital distance relay preventing over-reach and under-reach by detecting phase difference between the current for measuring the impedance of the digital distance relay and the current which is in a substantially same phase as the fault point current. The performance of the distance relay is adjusted on real-time basis with the change of phase difference.

According to a first aspect of the present invention, there is provided a digital distance relay for deciding whether a fault point is within a stipulated operation region by obtaining an impedance up to the fault point through a line equation of a transmission line including terms of resistances and reactances using data of voltage and current of AC power supply system periodically sampled, the relay comprising: a first means for calculating positive-phase resistance Rcal and positive-phase reactance Xcal: a second means for storing load current a stipulated time period prior to the fault was detected: a third means for detecting current in same phase as fault current flowing through the fault point: a fourth means for detecting relative phase of the current detected by the third means relative to current for directly calculating the positive-phase resistance Rcal and the positive-phase reactance Xcal: a fifth means for deciding whether the impedance is within a specified region by applying a value proportional to the relative phase detected by the fourth means: and a sixth means for deciding the fault point is within the stipulated operation region if: (a) when the load current stored by the second means indicates a sending current direction, the positive-phase resistance Rcal and positive-phase reactance Xcal are within a stipulated region based on a stipulated positive-phase resistance and a stipulated positive-phase reactance, and the impedance is decided within the specified region by the fifth means; or (b) when the load current stored by the second means indicates a receiving current direction, the positive-phase resistance Rcal and positive-phase reactance Xcal are within a stipulated region based on a stipulated positive-phase resistance and a stipulated positive-phase reactance, or the impedance is decided within the specified region by the fifth means.

By the first aspect of the present invention, when an impedance of the transmission line from the relay point up to the fault point is measured and it is decided whether the fault point is within the stipulated operation range, even if the load current is flowing and the fault point has a fault point resistance and there is an impedance measuring error, the relay operates correctly by compensating the relay characteristics.

According to a second aspect of the present invention, there is provided a digital distance relay of the first aspect of the present, the third means comprising: means for detecting current during the fault which is subtracted by the load current stored in the second means, when the fault is a phase fault: and means for detecting zero-phase current, when the fault is a ground fault.

By the second aspect of the present invention, the current in substantially the same phase as the fault current flowing through the fault point is detected. The input current in the relay partly canceled by the load current is applied when there is a phase fault, and a zero-phase current is applied as a current corresponding to a fault current when there is a ground fault.

According to a third aspect of the present invention, there is provided a digital distance relay of the second aspect of the present invention, the third means comprising means for detecting electric values of "(IVpc) /|Vp|–(ILVpc)M/|VpM|" and "(IVps)/|Vp|–(ILVps)M/|VpM|" when the fault is a phase fault, where IVpc and IVps are, respectively, inner and outer products of the load current during the fault and a stipulated standard electric value, |VpM| is a magnitude of the stipulated standard electric value, (ILVpc)M and (ILVps)M are, respectively, inner and outer products of the load current stored in the second means and a stipulated standard electric value at a same time M, and |VpM| is a magnitude of the standard electric value at the same time M.

By the third aspect of the present invention, in case of a phase fault, the fault current is stored in two components, one in a same phase (i.e. inner product) and the other in a perpendicular phase (i.e. outer product) as the positive-phase voltage which does not change much through the occurrence of the fault, and in respect also of the current which is added by the load current during the fault, two components, one in a same phase and the other in a perpendicular phase as the positive-phase voltage are calculated. Then, the stored load current component prior to the fault is canceled from each component of the current during the fault, and the fault point current is detected in the same phase and in the perpendicular phase as the positive-phase voltage.

According to a fourth aspect of the present invention, there is provided a digital distance relay of the third aspect of the invention, the fourth means comprising:

means for calculating, in case of a phase fault, $$Ipc=\{(Ips)/|Vp|-(ILVps)M/|VpM|\}\cdot(IVpc)/|Vp|-\{(IVpc)/|Vp|-(ILVpc)M/|VpM|\}\cdot(IVPs)/|VP| \quad (5)$$

and $$Ips=\{(Ipc)/|Vp|-(ILVpc)M/|VpM|\}\cdot(IVpc)/|Vp|+\{(IVps)/|Vp|-(ILVps)M/|VpM|56\cdot(IVps)/|Vp| \quad (6)$$

from the IVpc and IVps which are, respectively, inner and outer products of the load current during the fault and a stipulated standard electric value, the electric values of "(IVpc)/|Vp|–(ILVpc)M/|VpM|" and "IVps/|Vp|–(ILVps)M/|VpM|" calculated by the third means, wherein "(ILVpc)M/|VpM|" and "(ILVps)M/|VpM|" are, respectively, components of the load current prior to the fault parallel and perpendicular to the standard voltage: and means for detecting relative phase of the current during the fault relative to the current in same phase as the current detected by the third means.

By the fourth aspect of the present invention, when a phase fault is detected, tan θ is calculated where θ is a phase angle between FA and FB shown in FIG. 2, through calculation of the inner and outer products of the current corresponding to the fault point current and the relay current by canceling the load current prior to the fault from the relay current for measuring impedance during the fault by the following equations:

The inner product of a current corresponding to the fault current and the current used when the impedance of the relay is measured (added by the load current):

$$Ipc = IF \cdot \cos\theta \quad (7)$$
$$= \{(Ips)/|Vp| - (ILVps)M/|VpM|\} \cdot (IVpc)/|Vp| -$$
$$\{(IVpc)/|Vp| - (ILVpc)M/|VpM|\} \cdot (IVps)/|Vp|$$

where θ=θF–θi;

The outer product of a current corresponding to the fault current and the current used when the impedance of the relay is measured (added by the load current):

$$Ipc = IF \cdot \sin\theta \quad (8)$$
$$= \{(Ipc)/|Vp| - (ILVpc)M/|VpM|\} \cdot (IVpc)/|Vp| +$$
$$\{(IVps)/|Vp| - (ILVps)M/|VpM|\} \cdot (IVps)/|Vp|$$

and $$\tan\theta = Ipc/Ips \quad (9)$$

From those equations, advance or delay of the phase of the current during the fault to the current corresponding to the fault current flowing through the fault point.

According to a fifth aspect of the present invention, there is provided a digital distance relay of the first aspect of the present invention, the fourth means comprising: means for detecting relative phase of the current during the fault, in a case of a phase fault, relative to the current detected by the third means, based on a ratio of outer and inner products of a current "I" for directly calculating the resistance and the reactance, and a difference current "ΔI" between "I" and a current which is a stipulated period prior to the current "I" and which is in a same phase as the current "I".

By the fifth aspect of the present invention, when a phase fault is detected, the inner and outer products of ΔI and "I" are calculated and "tan θ" is calculated as follows, where "I" is a current for directly calculating resistance and reactance components, ΔI=I−IL (instant value) is a difference between "I" and IL which is the current at a time a stipulated period earlier (corresponding to a load current), and θ is the phase angle between FA and FB shown in FIG. 2.

$$(\Delta I \cdot I)c = |\Delta I \cdot I| \cdot \cos(\theta)$$

$$(\Delta I \cdot I)s = |\Delta I \cdot I| \cdot \sin(\theta)$$

$$\tan(\theta) = (\Delta I \cdot I)s/(\Delta I \cdot I)c \tag{10}$$

From the equations above, advance or delay of the phase of the current flowing during the fault to the current corresponding to the fault current flowing through the fault point is detected.

According to a sixth aspect of the present invention, there is provided a digital distance relay of the first aspect of the present invention, the fourth means comprising: means for detecting phase of current during the fault relative to the current detected by the third means when a ground fault has occurred, from a ratio of an outer product (I0·Ir)s and an inner product (I0·Ix)c; where the outer product (I0·Ir)s is an outer product of a zero-phase current I0 and a current Ir=ia+(kr−1)#i0, where "ia" is a ground fault phase current, "kr" is a value proportional to a ratio of a zero-phase resistance component and positive-phase resistance component of the transmission line impedance: and the inner product (I0·Ix)c is an inner product of a zero-phase current I0 and a current "Ix=ia+(kx−1)·i0", where "kx" is a value proportional to a ratio of a zero-phase reactance component and positive-phase reactance component of the transmission line impedance.

By the sixth aspect of the present invention, when a ground fault is detected, a current Ir=ia+(kr−1)·i0 is applied to a current for calculating resistance and reactance components to calculate the outer product (I0·Ir)s and the inner product (I0·Ix)c. Then, tan(θ) is calculated as follows, where θ is a phase angle between FA and FA shown in FIG. 2:

$$(I0 \cdot Ix)c = |I0 \cdot Ix| \cdot \cos(\theta)$$

$$(I0 \cdot Ix)s = |I0 \cdot Ix| \cdot \sin(\theta)$$

$$\tan(\theta) = (I0 \cdot Ir)s/(I0 \cdot Ix)c \tag{11}$$

From the equations above, advance or delay of the phase of the current Ir and Ix for measuring resistance and reactance components up to the fault point during the fault to the zero-phase current "i0" corresponding to the fault current flowing the fault point is detected.

According to a seventh aspect of the present invention, there is provided a digital distance relay of the first aspect of the invention, the fifth means comprising: means for deciding, in case of a phase fault, that the relay should operate only if "k·Ips/Ipc" is larger than or equal to "(Xcal−Xs)/(Rcal−Rs)", wherein Ips and Ipc are calculated by the fourth means, k is a pre-determined constant, Rcal is a resistance component calculated by the first means, Rs is a pre-determined resistance component, Xcal is a reactance component calculated by the first means, and Xs is a pre-determined reactance component.

By the seventh aspect of the present invention, when a phase fault is detected, the resistance component Rcal and the reactance component Xcal up to the fault point are separately calculated from the electric values between the short-circuited phases. Then, the relay is decided to operate when the following equation is satisfied, wherein the resistance component Rs and the reactance component Xs are pre-determined, and the electric values of Ips and Ipc are stipulated above:

$$Xcal - Xs \leq (Ips/Ipc) \cdot k \cdot (Rcal - Rs) \tag{12}$$

where k is a pre-determined constant.

The above equation is transformed as follows:

$$Ipc \cdot (Xcal - Xs) \leq k \cdot Ips \cdot (Rcal - Rs) \tag{13}$$

Where the constant k is put k=1.0+ε, and ε is set positive when it is set larger than the calculated θ shown in FIG. 3, and is set negative when it is set smaller, as shown in FIG. 3.

In FIG. 3, FA corresponds to the measured value of θ, and the line of "k>1" corresponds to a tendency of "under-reach" compared to the measured value, and the line of "k<1" corresponds to a tendency of "over-reach" compared to the measured value.

Thus, the impedance measurement error of the distance relay is compensated on real-time basis by calculating the current phase angle correlation based on the current corresponding to the fault point current and the current for the impedance measuring.

According to an eighth aspect of the present invention, there is provided a digital distance relay of the first aspect of the invention, the fifth means comprising: means for deciding, in a case of a ground fault, that the relay should operate only if (k·(I0·Ir)s/(I0·Ix)c) is larger than or equal to (Xcal−Xs)/(Rcal−Rs), wherein (I0·Ir)s and (I0·Ix)c are calculated by the fourth means, k is pre-determined constant, Rcal is a resistance component calculated by the first means, Rs is a pre-determined resistance component, Xcal is a reactance component calculated by the first means, and Xs is a pre-determined reactance component.

By the eighth aspect of the present invention, when a ground fault is detected, the resistance component Rcal and the reactance component Xcal up to the fault point are separately calculated from the electric current compensated for zero-phase. Then, the relay is decided to operate when the following equation is satisfied, wherein the resistance component Rs and the reactance component Xs are pre-determined, and the electric values of (I0·Ix)c and (I0·Ir)s are stipulated above:

$$Xcal - Xs \leq \{(I0 \cdot Ir)s/(I0 \cdot Ix)c\} \cdot k \cdot (Rcal - Rs) \tag{14}$$

where k is a pre-determined constant.

The above equation is transformed as follows:

$$(I0 \cdot Ix)c \cdot (Xcal-Xs) \leq k \cdot (I0 \cdot Ir)s-(Rcal-Rs) \quad (15)$$

where the constant k is put k=1+ϵ, and ϵ is set positive when it is set larger than the calculated θ shown in FIG. 3, and is set negative when it is set smaller, as shown in FIG. 3.

Thus, the impedance measurement error of the distance relay is compensated on real-time basis by calculating the current phase angle correlation based on the current corresponding to the fault point current and the current for the impedance measuring.

According to a ninth aspect of the present invention, there is provided a digital distance relay of the seventh or eighth aspects of the invention, the sixth means comprising: means for deciding: when the load current stored by the second means is flowing in sending direction, that the relay should operate, if (Xcal−Xs)/(Rcal−Rs) is smaller than a pre-determined constant, and if the fifth means decides that the relay should operate: and when the load current stored by the second means is flowing in receiving direction, that the relay should operate, if (Xcal−Xs)/(Rcal−Rs) is smaller than a pre-determined constant, or if the fifth means decides that the relay should operate: wherein Rcal is a resistance component calculated by the first means, Rs is a pre-determined resistance component, Xcal is a reactance component calculated by the first means, and Xs is a pre-determined reactance component.

By the ninth aspect of the present invention, the operation characteristics is changed depending on the direction of the load current prior to the fault. Thus, the sixth means decides that: the region below the straight line NF and below the straight line FM shown in FIG. 4 is the relay operation region when the load current stored by the second means is in sending direction: while the region below the straight line NF or below the straight line FL shown in FIG. 5 is the relay operation region when the load current stored by the second means is in sending direction.

According to a tenth aspect of the present invention, there is provided a digital distance relay of the seventh or eighth aspects of the invention, the sixth means comprising: means for deciding: when Rcal is smaller than or equal to Rs, that the relay should operate, if (Xcal −Xs)/(Rcal−Rs) is smaller than a pre-determined constant, and if the fifth means decides that the relay should operate: wherein Rcal is a resistance component calculated by the first means, Rs is a pre-determined resistance component, Xcal is a reactance component calculated by the first means, and Xs is a pre-determined reactance component.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Figure 6:
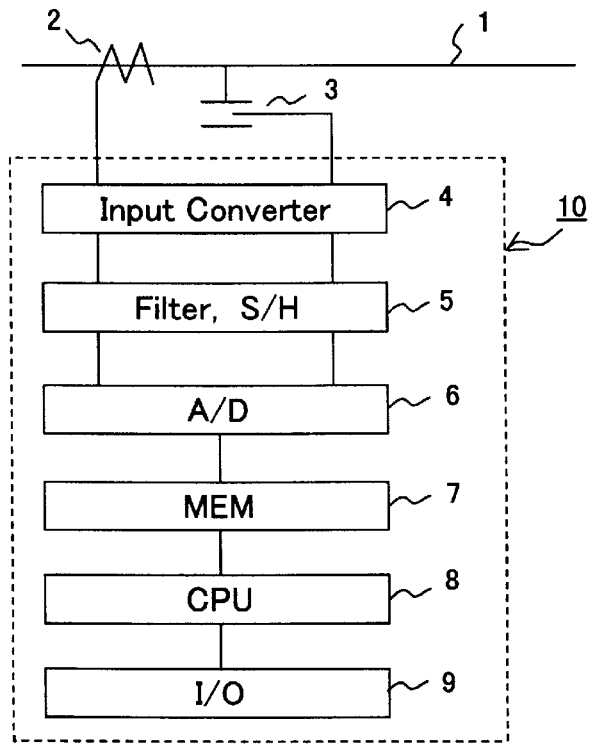
FIG. 6 is a schematic block diagram of an embodiment of a distance relay according to the present invention.

FIG. 6 shows an embodiment of a hardware structure of a digital distance relay for power transmission system according to the present invention. As shown in FIG. 6, the digital distance relay 10 is connected to a power transmission line with a current transformer 2 and a voltage transformer 3. The relay 10 comprises an input transducer 4, a sampling-holding circuit 5, an analogue-digital converter 6, a memory 7, a central processing unit (CPU) 8 and an input-output interface circuit 9. The input transducer 4 receives the outputs of the current transformer 2 and the voltage transformer 3 and change them into respective appropriate levels. The sampling-holding circuit 5 samples and holds the outputs of current and the voltage. The analogue-digital converter 6 converts analogue data of the current and voltage output from the sampling-holding circuit 5. The memory 7 stores data prior to and during the faults. The CPU 8 decides whether the digital distance relay 10 operates and sends a command to turn off the circuit breaker based on the current and the voltage data. The input-output interface circuit 9 outputs the decision of the digital distance relay 10.

Figure 7:
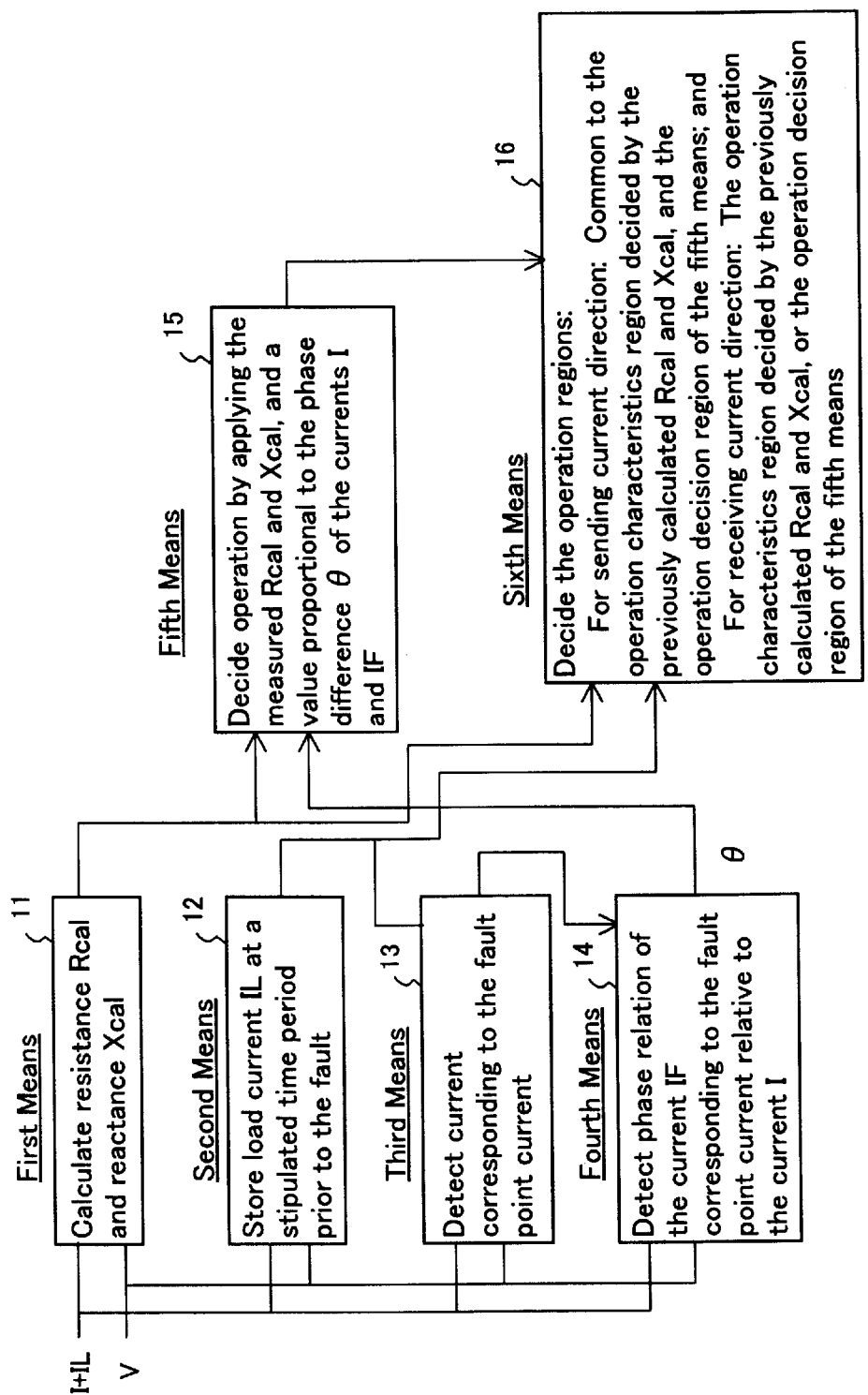
FIG. 7 is a logic diagram of an embodiment of a distance relay according to the present invention.

FIG. 7 shows a logic diagram of the decisions performed by the CPU 8 of the digital distance relay 10 shown in FIG. 6.

In the first means 11, the reactance component Xcal and the resistance component Rcal up to the fault point are calculated by line equations of the transmission lines. The calculation algorithm is described in IEEE Transaction of Power Delivery, Vol.4, No.4, October 1989, p2025–2031.

In the second means 12, the current (or load current) prior to the fault is stored. The magnitude and the phase of the load current may be stored in outer and inner products of the load current of the present phase and the positive-phase voltage of the present phase standard divided by the magnitude of the voltage of the positive-phase as follows:

The inner product becomes:

$$\{|IL|\cdot|Vp|\cdot\cos(\theta L)\}/|Vp|=\{(iL/dt)m\cdot vpn-(iL/dt)n\cdot vpm\}/|Vp| \quad (16)$$

And the outer product becomes:

$$\{|IL|\cdot|Vp|\cdot\sin(\theta L)\}/|Vp|=\{iLn\cdot vpm-(iLm\cdot vpm)\}/|Vp| \quad (17)$$

wherein: θL is the current advanced phase angle relative to the positive-phase voltage Vp; iLm is the instantaneous value of the load current IL at the time tm; (iL/dt)m is the instantaneous value of time differential value of IL.

Then, the instantaneous value of the positive-phase voltage Vp in the a-phase basis, for example, is expressed as follows:

$$vpm=(vam-v0m)+j(vbm-vcm)/\sqrt{3}$$

wherein vam, vbm, vcm and v0m are respectively, the instantaneous value of voltages in a-, b-, c- and zero-phases, and j is a 90 degrees phase-advancing treatment.

Figure 8:
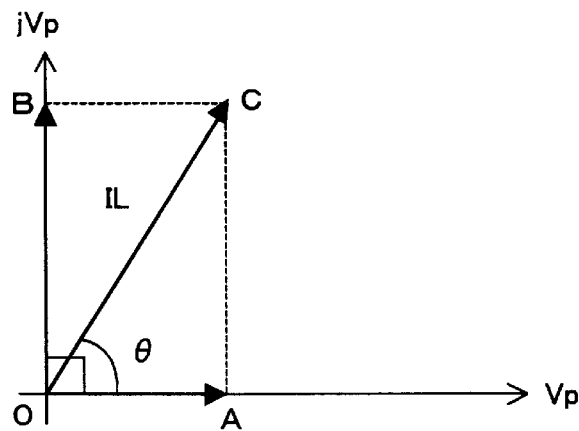
FIG. 8 is a vector diagram showing the function of the second means shown in FIG. 7.

The relation described above is shown in FIG. 8. OA corresponding to the load current OC (IL) component in the same phase as the positive voltage is the inner product, and OB corresponding to the load current OC (IL) component perpendicular to the positive voltage is the outer product.

Figure 1:
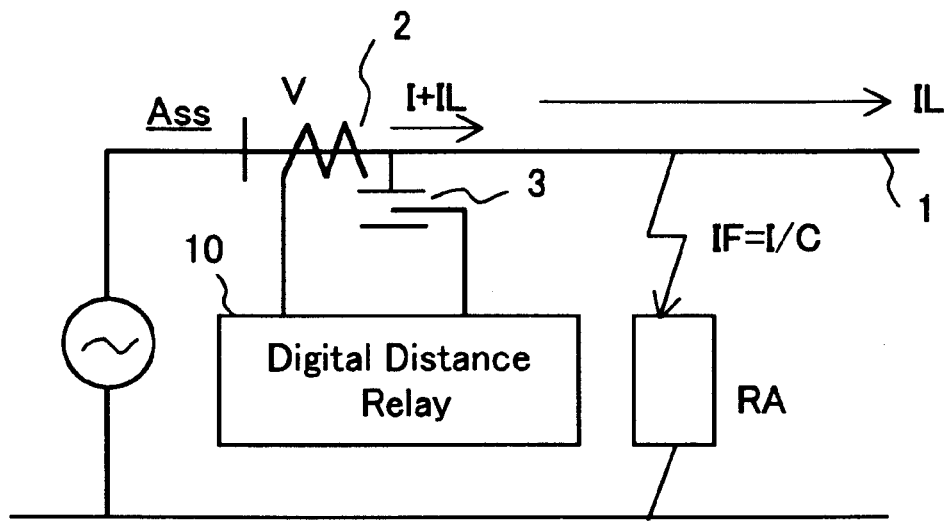
FIG. 1 is a schematic circuit diagram of a power supply system incorporating a distance relay when a fault has occurred.
Figure 2:
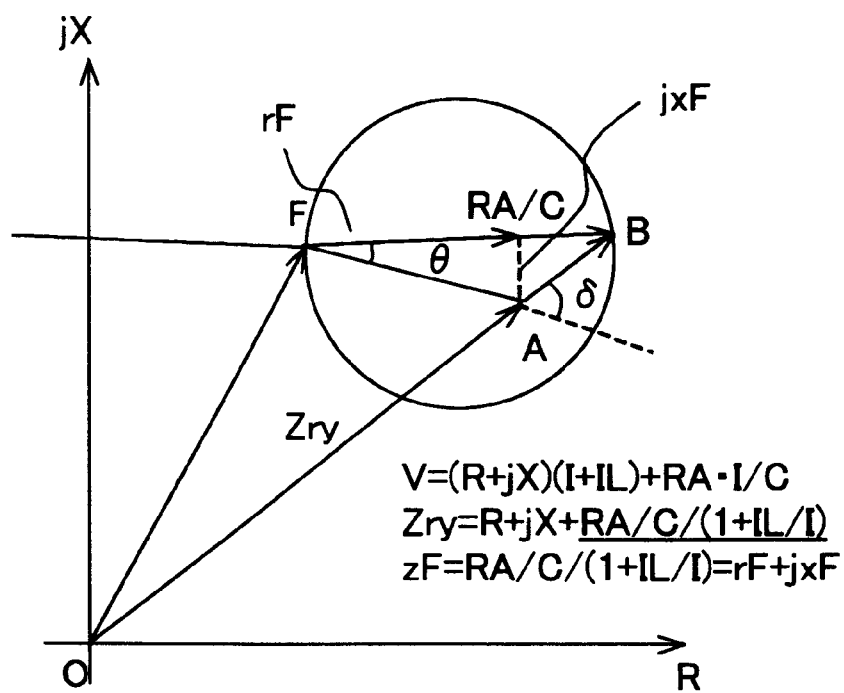
FIG. 2 is an R-X diagram showing vector relationships in impedance measurements in relation to the present invention.
Figure 3:
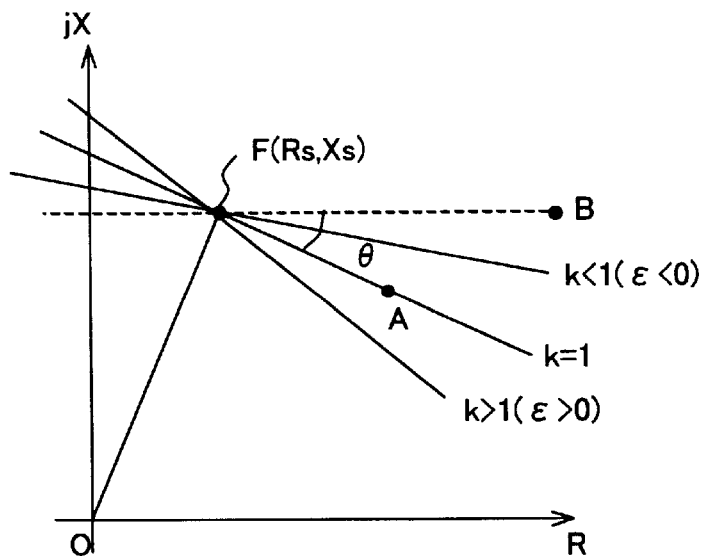
FIG. 3 is an R-X diagram showing characteristics in relation to the present invention.
Figure 4:
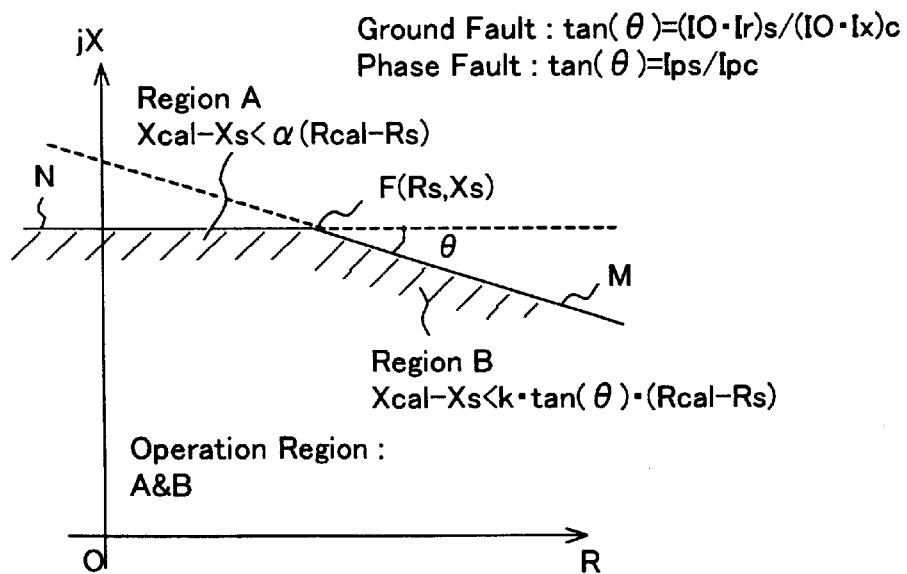
FIG. 4 is an R-X diagram showing characteristics in relation to the present invention when the current is in sending direction.
Figure 5:
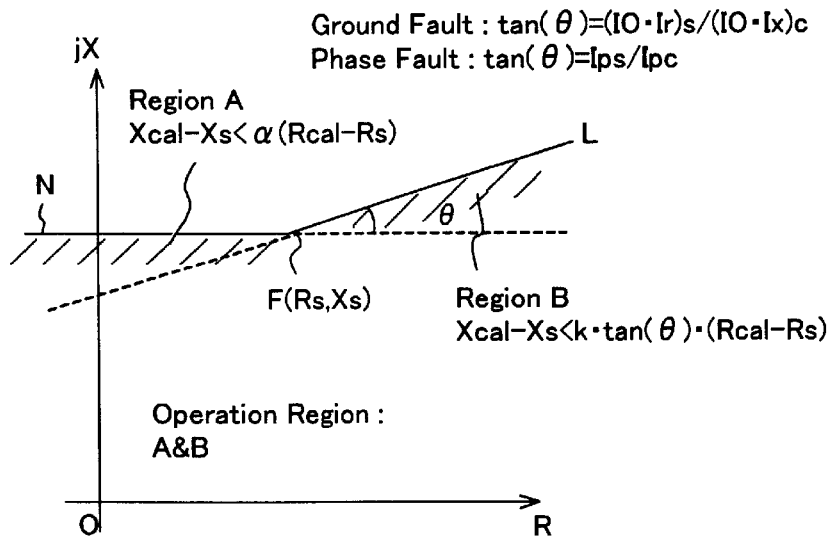
FIG. 5 is an R-X diagram showing characteristics in relation to the present invention when the current is in receiving direction.

The third means 13 detects the current corresponding to the fault point, and it detects the current corresponding to the fault current I/C shown in FIG. 1.

Figure 9:
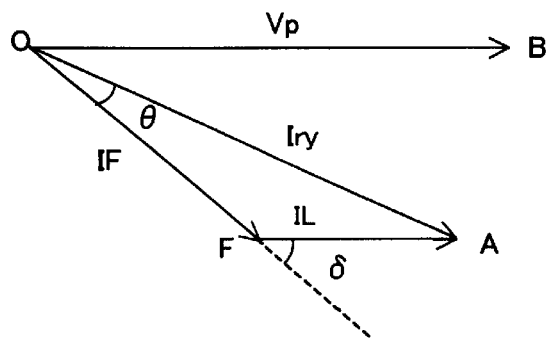
FIG. 9 is a vector diagram showing the function of the third means shown in FIG. 7.

In the fourth means 14, the phase relation between the current corresponding to the fault point current detected by the third means 13 and the current for measuring the impedance of the digital distance relay 10 is detected. FIG. 9 shows the relation of each load current IL and the current Iry shown as OA for measuring impedance of the digital distance relay, and the current "IF" corresponding to the fault point current, shown as "OF". From Iry and IF in FIG. 9, the phase between them can be detected.

The fifth means 15 is a means for materializing performance characteristics of the digital distance relay with an operation limit of a line with an inclination proportional to the phase θ relative to the Rs and the Xs which are pre-determined for the relay.

In the sixth means, it is decided whether the load current is in a sending direction or in a receiving direction based on the inner product calculated by the second means 12.

When the load current is in a sending direction, the operation region is set as a common region (or an "AND" region) of the region with a boundary of a straight line which has a pre-determined inclination and which intersects pre-determined point of (Rs, Xs) and the operation region decided by the fifth means 15. When the load current is in a receiving direction, the operation region is set as an "OR" region of the region with a boundary of a straight line which has a pre-determined inclination and which intersects pre-determined point of (Rs, Xs) and the operation region decided by the fifth means 15.

Figure 10:
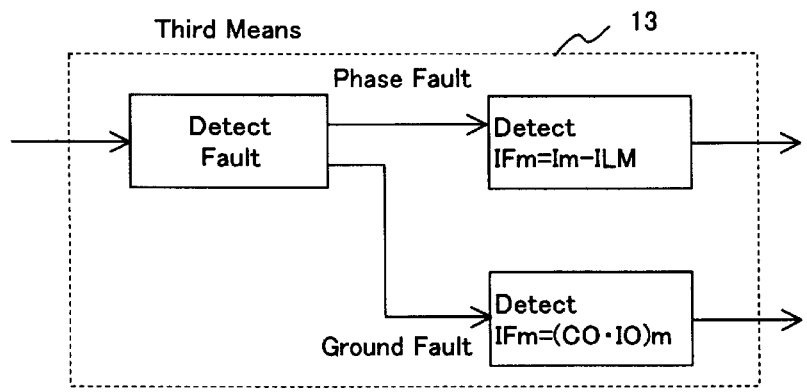
FIG. 10 is a block diagram of the third means shown in FIG. 7.

FIG. 10 shows an example of the third means 13 corresponding to the second aspect of the present invention by which the current corresponding to the fault point current is calculated. In this example, for a phase fault, the current stored prior to the fault is canceled from the current applied for impedance measurement of the digital distance relay, and for a ground fault, the zero-phase current is detected.

Figure 11:
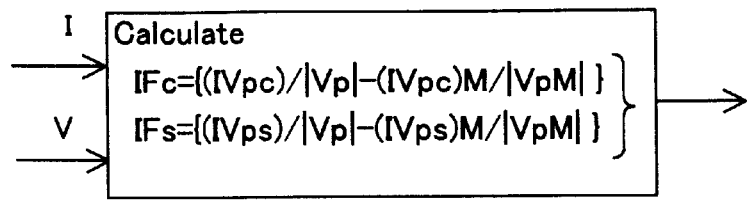
FIG. 11 is a block diagram of the third means shown in FIG. 7 when a phase fault has occurred.

FIG. 11 shows, in case of a phase fault, that the components of the current prior to and during the fault in the same phase as and in perpendicular phase to the positive-phase voltage are calculated, and the components in the same phase and the perpendicular phase of the current prior to the fault are canceled from the corresponding components of the current during the fault by the following equations:

$$IFc=\{(IVpc)/|Vp|-(IVpc)M/|VpM|$$

$$IFs=\{(IVps)/|Vp|-(IVps)M/|VpM|$$

The reason for setting the positive-phase voltage as the basis is that the positive-phase voltage does not change much prior to and during the fault as shown in Japanese Patent Application Publication (Tokkaihei) 8-19169.

Figure 12:
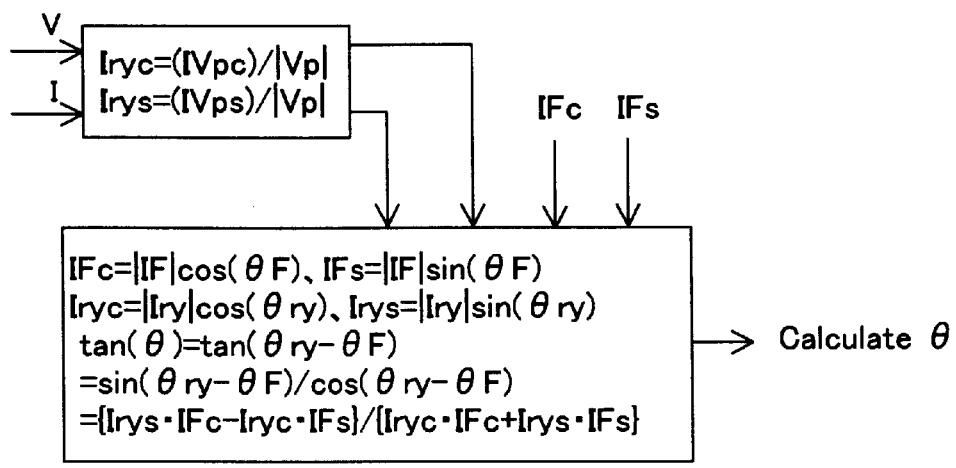
FIG. 12 is a block diagram of the fourth means shown in FIG. 7 when a phase fault has occurred.

FIG. 12 shows an example of the fourth means 14 corresponding to the fourth aspect of the present invention. This figure shows means for detecting phase relation between the current corresponding to the fault current and the current for measuring the impedance of the digital distance relay. In case of a phase fault, the same-phase component IFc and the perpendicular-phase component IFs of the current corresponding to the fault point current relative to the positive-phase voltage are as follows:

$$\begin{aligned}IFc &= |IF|\cdot\cos(\theta F) \\ &= \{(IVpc)/|Vp|-(ILVpc)M/|VpM|\end{aligned} \quad (18)$$

$$\begin{aligned}IFs &= |IF|\cdot\sin(\theta F) \\ &= \{(IVps)/|Vp|-(ILVps)M/|VpM|\end{aligned}$$

where θF is an advance phase of IF relative to the positive-phase voltage Vp.

The same-phase component Iryc and the perpendicular-phase component Irys in respect of the positive-phase voltage of the current for measuring the impedance of the digital distance relay are as follows:

$$\begin{aligned}Iryc &= |Iry|\cdot\cos(\theta ry) \\ &= (IVpc)/|Vp|\end{aligned} \quad (19)$$

$$\begin{aligned}Irys &= |Iry|\cdot\sin(\theta ry) \\ &= (IVps)/|Vp|\end{aligned}$$

where θry is an advance phase of Iry relative to the positive-phase voltage Vp.

Therefore, the phase difference θ=θF−θry between the current IF corresponding to the fault current and the current Iry for measuring the impedance of the digital distance relay is calculated by Equation (20) as follows:

$$Ips = |IF| \cdot |Iry| \cdot \sin(\theta F - \theta ry) \quad (20)$$
$$= |IF| \cdot \sin(\theta F) \cdot |Iry| \cdot \cos(\theta ry) -$$
$$|IF| \cdot \cos(\theta F) \cdot |Iry| \cdot \sin(\theta ry)$$
$$= \{(IVps)/|Vp| - (ILVps)M/|VpM|\} \cdot$$
$$(IVpc)/|Vp| - \{(IVpc)M/|Vp| - (ILVpc)M/$$
$$|VpM|\} \cdot (IVps)/|Vp|$$

$$Ipc = |IF| \cdot |Iry| \cdot \cos(\theta F - \theta ry)$$
$$= |IF| \cdot \cos(\theta F) \cdot |Iry| \cdot \cos(\theta ry) +$$
$$|IF| \cdot \sin(\theta F) \cdot |Iry| \cdot \sin(\theta ry)$$
$$= \{(IVpc)/|Vp| - (ILVpc)M/|VpM|\} +$$
$$(IVps)/|Vp| + \{(IVps)M/|Vp| - (ILVps)M/$$
$$|VpM|\} \cdot (IVps)/|Vp|$$

Figure 13:
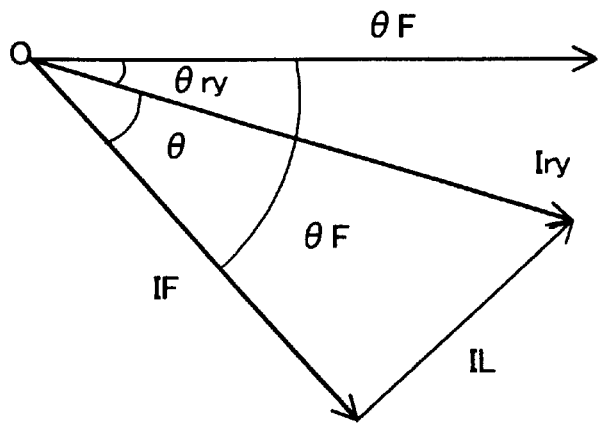
FIG. 13 is a vector diagram showing the phase relation of the fourth means shown in FIG. 7.

The relation of θ=θF−θry, IF and Iry in the Equation (20) is shown in FIG. 13.

Figure 14:
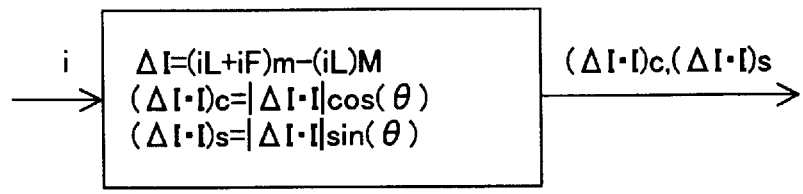
FIG. 14 is a block diagram of the fourth means shown in FIG. 7 when a phase fault has occurred.

FIG. 14 shows an example of the fourth means 14 corresponding to the fifth aspect of the present invention. This figure shows means for detecting phase relation between the current "I" for measuring the impedance of the digital distance relay and the differential current "ΔI" between the current "I" and the current "IL" in the same phase a time period prior to the current "I".

Figure 15A:
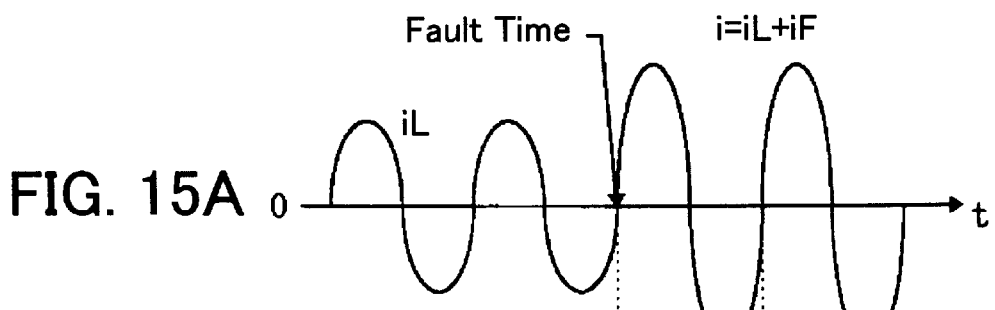
FIGS. 15A and 15B are time charts showing effects of the fourth means shown in FIG. 7.
Figure 15B:
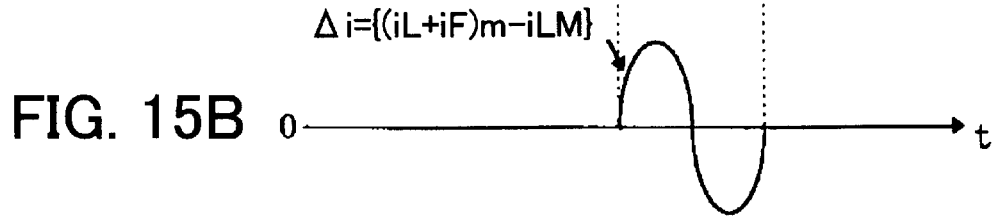

FIGS. 15A and 15B show the relation between the current "I" and the instantaneous value of the current IL a time period prior to the current "I". In FIG. 15A, the instantaneous current "i" for measuring the impedance of the digital distance relay is the sum "i=iF+iL" of the instantaneous value corresponding to the fault current "iF" and the load current "iL". The instantaneous current "i" is the load current "iL", since iF=0. FIG. 15B shows the current of the current "i" subtracted by the load current "iL" prior to the fault, i.e. the current corresponding to the fault point current.

Figure 16:
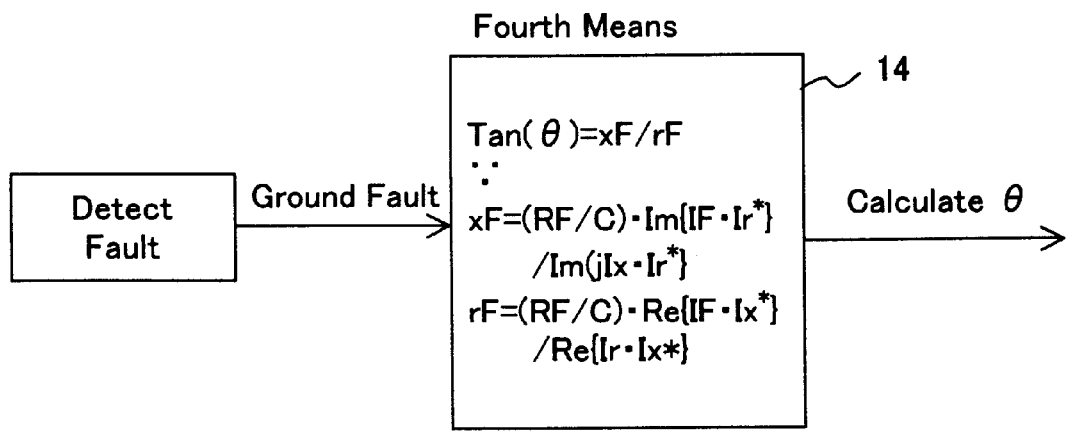
FIG. 16 is a block diagram of the fourth means shown in FIG. 7.
Figure 17:
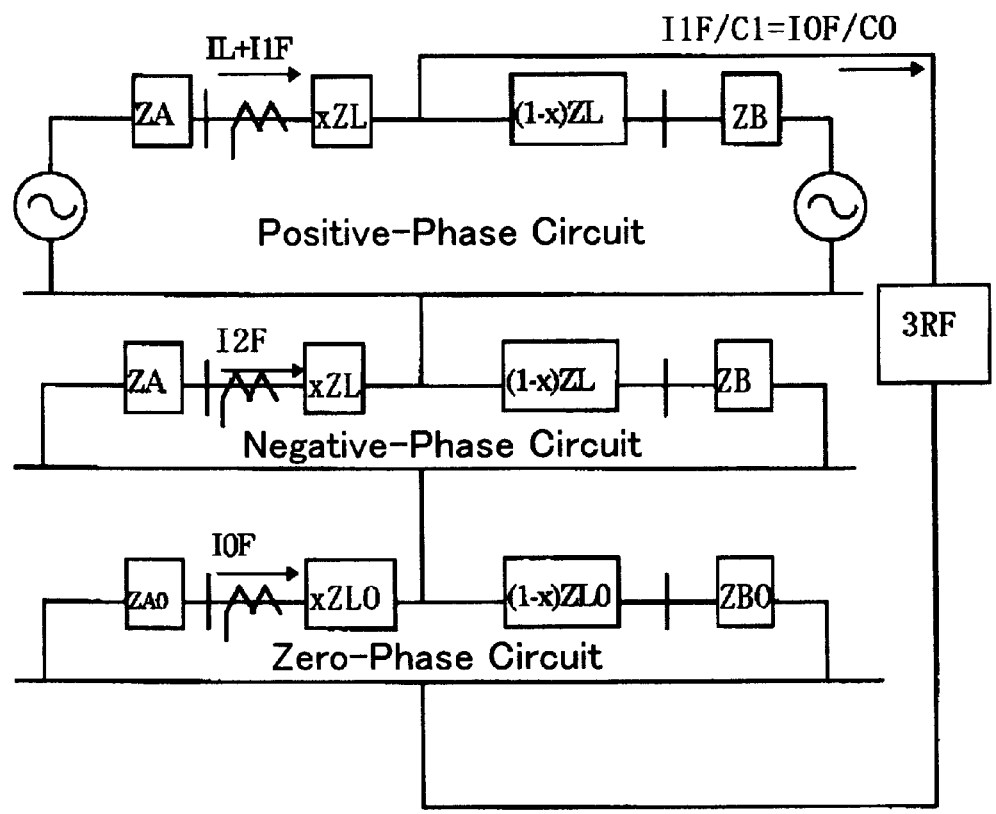
FIG. 17 is an equivalent circuit for symmetry in case of a one-line ground fault.

FIG. 16 shows an example of the fourth means 14 corresponding to the sixth aspect of the present invention. This figure shows that the fourth means 14 detects phase relation of the zero-phase compensated current "Ir" of the resistance component and the zero-phase compensated current "Ix" of the reactance component as the current for measuring impedance of the digital distance relay, and the zero-phase current corresponding to the fault point current. The voltage V during the ground fault is expressed with the resistance R and reactance X of the transmission line and the fault point resistance RF as follows:

$$V = R \cdot Ir + jX \cdot Ix + RF \cdot IF \quad (21)$$

wherein "IF" is the fault current which flows to the fault point, and in case of a one-line ground fault, the symmetric current components in the positive-phase, negative-phase, zero-phase are equal as shown in FIG. 17. At the terminals for the digital distance relay in the positive-phase circuit, the load current is added. However, the zero-phase circuit is not affected by the load current, and the impedance angles of the both terminals seen from the fault point in the zero-phase circuit are substantially equal. Thus, the phases of the zero-phase current flowing through the fault point and the zero-phase current inputted to the digital distance relay are substantially equal. When this condition is assumed to be satisfied, following equations are derived:

$$Im[V \cdot Ir^*] = X \cdot Im[jIx \cdot Ir^*] + RF \cdot Im[IF \cdot Ir^*] \quad (22)$$
$$Xry = Im[V \cdot Ir^*]/Im[jIx \cdot Ir^*]$$
$$= X + RF \cdot Im[IF \cdot Ir^*]/Im[jIx \cdot Ir^*]$$
$$Xf = RF \cdot Im[IF \cdot Ir^*]/Im[jIx \cdot Ir^*]$$

$$Re[V \cdot Ix^*] = R \cdot Re[Ir \cdot Ix^*] + RF \cdot Re[IF \cdot Ix^*] \quad (23)$$
$$Rry = Re[V \cdot Ir^*]/Re[Ir \cdot Ix^*]$$
$$= R + RF \cdot Re[IF \cdot Ix^*]/Re[Ir \cdot Ix^*]$$
$$rF = RF \cdot Re[IF \cdot Ix^*]/Re[jIr \cdot Ix^*]$$

In the equations shown above, the zero-phase current I0 which is inputted to the digital distance relay is applied as the current corresponding to the fault point current "IF".

Figure 18:
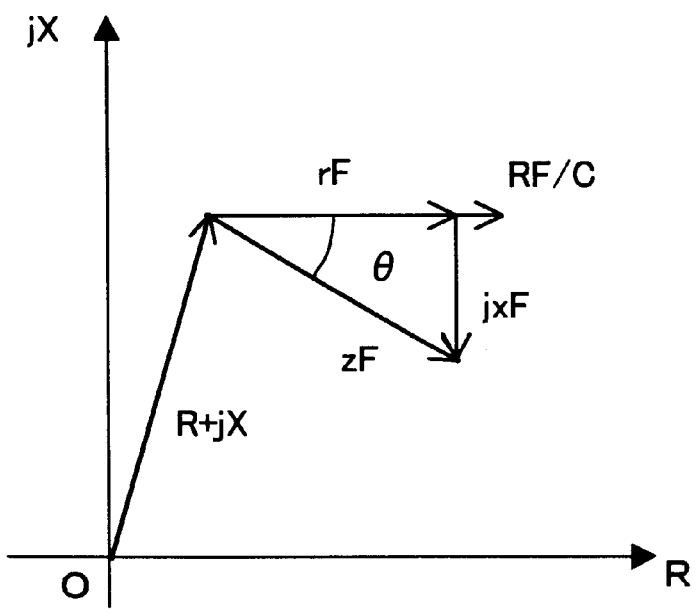
FIG. 18 is an R-X diagram showing an effect of the present invention.

The phase angle of the impedance viewing the fault point resistance is defined by the following equations, which is shown on an R-X plane in FIG. 18:

$$\tan(\theta) = xF/rF \quad (24)$$
$$= \{Im[IF \cdot Ir^*]/Im[jIx \cdot Ir^*]\}/$$
$$\{Re[IF \cdot Ix^*]/Re[Ir \cdot Ix^*]\}$$
$$= |Ir/Ix| \cdot \sin(\theta F - \theta r)/\cos(\theta F - \theta x)$$
$$= (I0/C0 \cdot Ir)s/(I0/C0 \cdot Ix)c$$

since $$|IF \cdot Ir| \cdot \sin(\theta F - \theta r) = Im[IF \cdot Ir^*]$$
$$= (I0/C0 \cdot Ir)s$$
$$|IF \cdot Ix| \cdot \cos(\theta F - \theta r) = Re[IF \cdot Ix^*]$$
$$= (I0/C0 \cdot Ix)c$$

wherein "C0" is the flow division ratio flowing to the relay terminal of the zero-phase current and it is assumed to be a substantially real number.

When the zero-phase current I0 is applied as the current corresponding to the fault point current IF, the phase θ in the equation above is detected.

Figure 19:
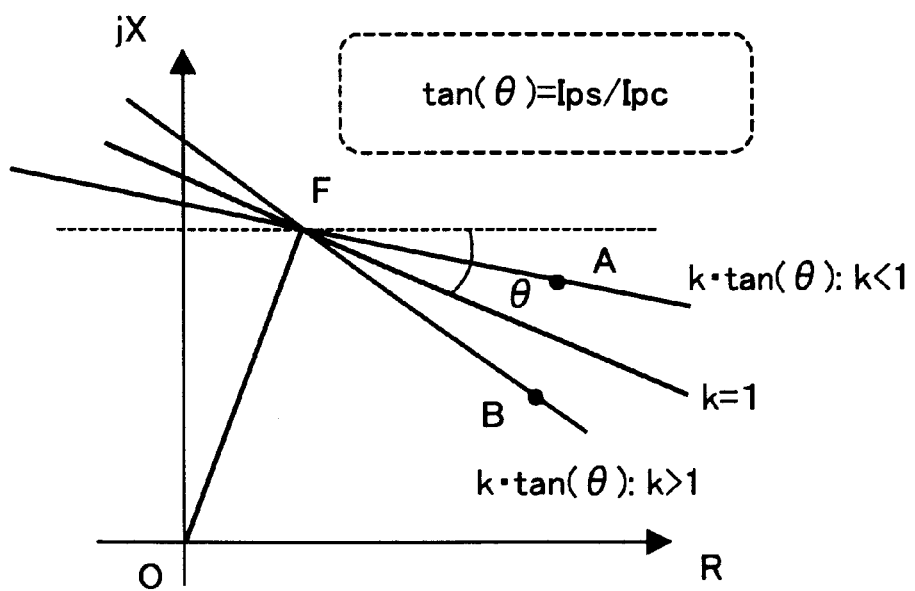
FIG. 19 is an R-X diagram showing an effect of the present invention.

FIG. 19 shows an example of the fifth means 15 corresponding to the seventh aspect of the present invention. This figure shows how the required performance is obtained by adjusting the performance with the resistance component Rcal and reactance component Xcal which are calculated by the first means 11, and a pre-determined constants Rs and Xs. The operation decision equation is linear as shown in the following equation:

$$Xcal - Xs < k \cdot \tan(\theta) \cdot (Rcal - Rs) \quad (25)$$

since $$\tan(\theta) = Ips/Ipc$$

wherein "k" is a pre-determined constant, and the performance for k<1 is shown by the straight line FA in FIG. 19 while the performance for k>1 is shown by the straight line FB in the same figure.

Figure 20:
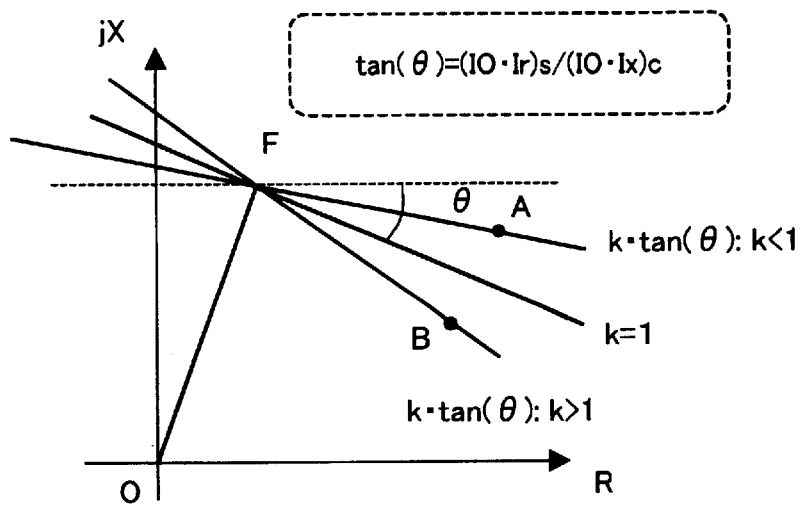
FIG. 20 is an R-X diagram showing an effect of the present invention.

FIG. 20 shows an example of the fifth means 15 corresponding to the eighth aspect of the present invention. This figure shows how the required performance is obtained by applying the electric values of (I0·Ir)s and (I0·Ix)c of Equation (11) and adjusting the resistance component Rcal and the reactance component Xcal which are directly calculated by the digital distance relay, and pre-determined constants Rs and Xs. The operation decision equation becomes linear as follows:

$$Xcal-Xs<k\cdot\tan(\theta)\cdot(Rcal-Rs) \qquad (26)$$

since $$\tan(\theta)=(I0\cdot Ir)s/(I0\cdot Ix)c$$

wherein "k" is a pre-determined constant, and the performance for k<1 is shown by the straight line FA in FIG. 20 while the performance for k>1 is shown by the straight line FB in the same figure.

Figure 21:
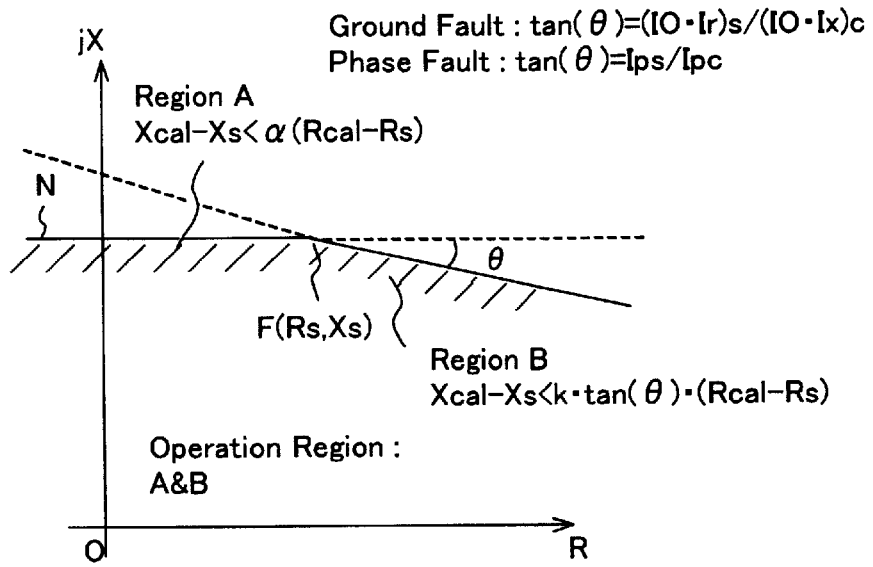
FIG. 21 is an R-X diagram showing an effect of the present invention when the current is in sending direction.
Figure 22:
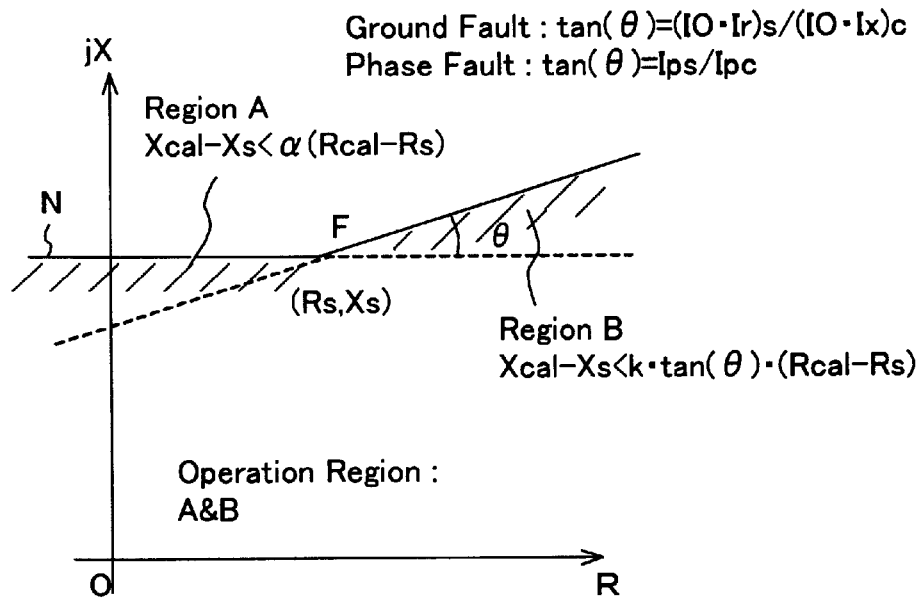
FIG. 22 is an R-X diagram showing an effect of the present invention when the current is in receiving direction.

FIGS. 21 and 22 show an example of the sixth means 16 corresponding to the ninth aspect of the present invention. FIG. 21 shows how the required performance is obtained if the load current prior to the fault was in a sending direction. FIG. 22 shows how the required performance is obtained if the load current prior to the fault was in a receiving direction.

Figure 23:
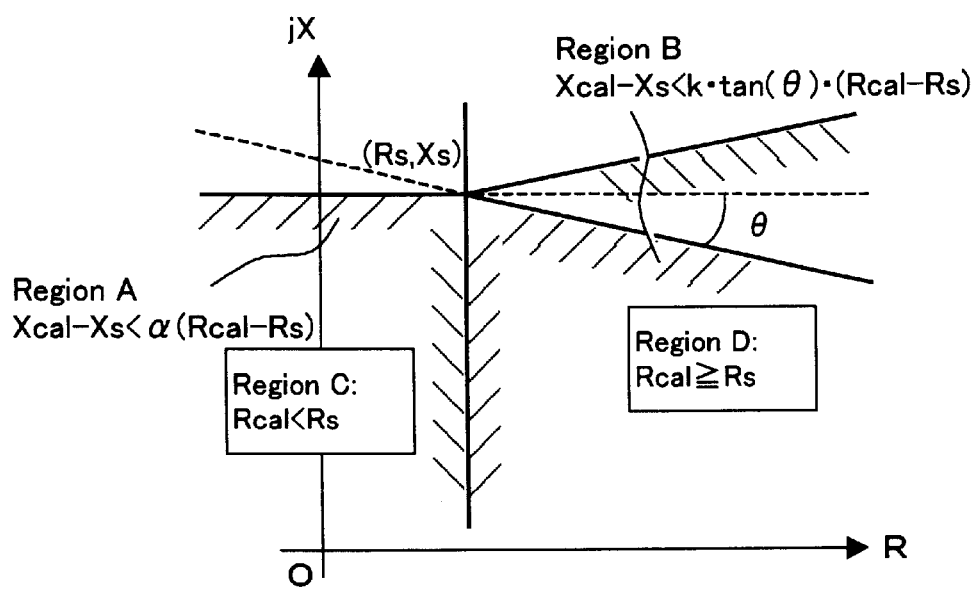
FIG. 23 is an R-X diagram showing an effect of the present invention.

FIG. 23 shows an example of the sixth means 16 corresponding to the tenth aspect of the present invention. This figure shows that the required performance is obtained by taking the region C when the resistance component Rcal calculated by the first means is smaller than the pre-determined value Rs, and that the required performance is obtained by taking the region D when the resistance component Rcal calculated by the first means is larger than the pre-determined value Rs. The region C is stipulated by the following formula:

$$Xcal-Xs<\alpha\cdot(Rcal-Rs)$$

The region D is stipulated by Equations (25) or (26) as follows:

$$Xcal-Xs<k\cdot\tan(\theta)\cdot(Rcal-Rs)$$

Some embodiments of the present invention have been disclosed above. Numerous modifications and variations of the present invention are possible in light of the above teachings. It is therefore to be understood that, within the scope of the appended claims, the present invention can be practiced in a manner other than as specifically described herein.

The entire disclosure of Japanese Patent Application No. 2000-194556 filed on Jul. 28, 2000 including specification, claims drawings and summary are incorporated herein by reference in its entirety.

What is claimed is:

1. A digital distance relay for deciding whether a fault point is within a stipulated operation region by obtaining an impedance up to the fault point through a line equation of a transmission line including terms of resistances and reactances using data of voltage and current of AC power supply system periodically sampled, the relay comprising:
    a first means for calculating positive-phase resistance Rcal and positive-phase reactance Xcal;
    a second means for storing load current a stipulated time period prior to the fault was detected;
    a third means for detecting current in same phase as fault current flowing through the fault point;
    a fourth means for detecting relative phase of the current detected by the third means relative to current for directly calculating the positive-phase resistance Rcal and the positive-phase reactance Xcal;
    a fifth means for deciding whether the impedance is within a specified region by applying a value proportional to the relative phase detected by the fourth means; and
    a sixth means for deciding the fault point is within the stipulated operation region if: (a) when the load current stored by the second means indicates a sending current direction, the positive-phase resistance Rcal and positive-phase reactance Xcal are within a stipulated region based on a stipulated positive-phase resistance and a stipulated positive-phase reactance, and the impedance is decided within the specified region by the fifth means; or (b) when the load current stored by the second means indicates a receiving current direction, the positive-phase resistance Rcal and positive-phase reactance Xcal are within a stipulated region based on a stipulated positive-phase resistance and a stipulated positive-phase reactance, or the impedance is decided within the specified region by the fifth means.

2. A distance relay according to claim 1, the third means comprising:
    means for detecting current during the fault which is subtracted by the load current stored in the second means, when the fault is a phase fault: and
    means for detecting zero-phase current, when the fault is a ground fault.

3. A distance relay according to claim 2, the third means comprising means for detecting electric values of "(IVpc)/|Vp|−(ILVpc)M/|VpM|" and "(IVps)/|Vp|−(ILVps)M/|VpM|" when the fault is a phase fault,
    where IVpc and IVps are, respectively, inner and outer products of the load current during the fault and a stipulated standard electric value, |Vp| is a magnitude of the stipulated standard electric value, (ILVpc)M and (ILVps)M are, respectively, inner and outer products of the load current stored in the second means and a stipulated standard electric value at a same time M, and |VpM| is a magnitude of the standard electric value at the same time M.

4. A distance relay according to claim 3, the fourth means comprising:
    means for calculating, in case of a phase fault, $$Ipc=\{(Ips)/|Vp|-(ILVps)M/|VpM|\}\cdot(IVpc)/|Vp|-\{(IVpc)/|Vp|-(ILVpc)M/|VpM|\}\cdot(IVps)/|Vp|$$

and $$Ips=\{(Ipc)/|Vp|-(ILVpc)M/|VpM|\}\cdot(IVpc)/|Vp|+\{(IVps)/|Vp|-(ILVps)M/|VpM|\}\cdot(IVps)/|Vp|$$

from the IVpc and IVps which are, respectively, inner and outer products of the load current during the fault and a stipulated standard electric value, the electric values of "(IVpc)/|Vp|−(ILVpc)M/|VpM|" and "IVps/|Vp|−(ILVPs)M/|VpM|" calculated by the third means, wherein "(ILVpc)M/|VpM|" and "(ILVps)M/|VpM|" are, respectively, components of the load current prior to the fault parallel and perpendicular to the standard voltage; and
    means for detecting relative phase of the current during the fault relative to the current in same phase as the current detected by the third means.

5. A distance relay according to claim 1, the fourth means comprising:
    means for detecting relative phase of the current during the fault, in a case of a phase fault, relative to the current detected by the third means, based on a ratio of outer and inner products of a current "I" for directly calculating the resistance and the reactance, and a difference current "ΔI" between "I" and a current which is a stipulated period prior to the current "I" and which is in a same phase as the current "I".

6. A distance relay according to claim 1, the fourth means comprising:
   means for detecting phase of current during the fault relative to the current detected by the third means when a ground fault has occurred, from a ratio of an outer product (I0·Ir)s and an inner product (I0·Ix)c;
   where the outer product (I0·Ir)s is an outer product of a zero-phase current I0 and a current Ir=ia+(kr−1)·i0, where ia is a ground fault phase current, kr is a value proportional to a ratio of a zero-phase resistance component and positive-phase resistance component of the transmission line impedance; and
   the inner product (I0·Ix)c is an inner product of a zero-phase current I0 and a current "Ix=ia+(kx−1)·i0", where kx is a value proportional to a ratio of a zero-phase reactance component and positive-phase reactance component of the transmission line impedance.

7. A distance relay according to claim 1, the fifth means comprising:
   means for deciding, in a case of a phase fault, that the relay should operate only if "k·Ips/Ipc" is larger than or equal to "(Xcal−Xs)/(Rcal−Rs)",
   wherein:
   Ips and Ipc are calculated by the fourth means using the following equations:

$$Ipc=\{(Ips)/|Vp|-(ILVps)M/|VpM|\}·(IVpc)/|Vp|-\{(IVpc)/|Vp|-(ILVpc)M/|VpM|\}·(IVps)/|Vp|$$

and $$Ips=\{(Ips)/|Vp|-(ILVpc)M/|VpM|\}·(IVpc)/|Vp|+\{(IVpc)/|Vp|-(ILVpc)M/|VpM|\}·(IVps)/|Vp|$$

from the IVpc and IVps which are, respectively, inner and outer products of the load current during the fault and a stipulated standard electric value, the electric values of "(IVpc)/|Vp|−(ILVpc)M/|VpM|" and "IVps/|Vp|−(ILVps)M/|VpM|" calculated by the third means, wherein "(ILVpc)M/|VpM|" and "(ILVps)M/|VpM|" are, respectively, components of the load current prior to the fault parallel and perpendicular to the standard voltage; and
   k is a pre-determined constant, Rcal is a resistance component calculated by the first means, Rs is a pre-determined resistance component, Xcal is a reactance component calculated by the first means, and Xs is a pre-determined reactance component.

8. A distance relay according to claim 1, the fifth means comprising:
   means for deciding, in a case of a ground fault, that the relay should operate only if (k·(I0·Ir)s/(I0·Ix)c) is larger than or equal to (Xcal−Xs)/(Rcal−Rs),
   wherein:
   (I0·Ir)s is an outer product of a zero-phase current I0 and a current Ir=ia+(kr−1)·i0, where ia is a ground fault phase current, kr is a value proportional to a ratio of a zero-phase resistance component and positive-phase resistance component of the transmission line impedance; and
   (I0·Ix)c is an inner product of a zero-phase current I0 and a current "Ix=ia+(kx−1)·i0", where kx is a value proportional to a ratio of a zero-phase reactance component and positive-phase reactance component of the transmission line impedance; and
   k is pre-determined constant, Rcal is a resistance component calculated by the first means, Rs is a pre-determined resistance component, Xcal is a reactance component calculated by the first means, and Xs is a pre-determined reactance component.

9. A distance relay according to claim 7, the sixth means comprising:
   means for deciding:
   when the load current stored by the second means is flowing in sending direction, that the relay should operate, if (Xcal−Xs)/(Rcal−Rs) is smaller than a pre-determined constant, and if the fifth means decides that the relay should operate; and
   when the load current stored by the second means is flowing in receiving direction, that the relay should operate, if (Xcal−Xs)/(Rcal−Rs) is smaller than a pre-determined constant, or if the fifth means decides that the relay should operate;
   wherein Rcal is a resistance component calculated by the first means, Rs is a pre-determined resistance component, Xcal is a reactance component calculated by the first means, and Xs is a pre-determined reactance component.

10. A distance relay according to claim 7, the sixth means comprising:
    means for deciding:
    when Rcal is smaller than or equal to Rs, that the relay should operate, if (Xcal−Xs)/(Rcal−Rs) is smaller than a pre-determined constant, and if the fifth means decides that the relay should operate;
    wherein Rcal is a resistance component calculated by the first means, Rs is a pre-determined resistance component, Xcal is a reactance component calculated by the first means, and Xs is a pre-determined reactance component.

11. A distance relay according to claim 8, the sixth means comprising:
    means for deciding:
    when the load current stored by the second means is flowing in sending direction, that the relay should operate, if (Xcal−Xs)/(Rcal−Rs) is smaller than a pre-determined constant, and if the fifth means decides that the relay should operate; and
    when the load current stored by the second means is flowing in receiving direction, that the relay should operate, if (Xcal−Xs)/(Rcal−Rs) is smaller than a pre-determined constant, or if the fifth means decides that the relay should operate;
    wherein Rcal is a resistance component calculated by the first means, Rs is a pre-determined resistance component, Xcal is a reactance component calculated by the first means, and Xs is a pre-determined reactance component.

12. A distance relay according to claim 8, the sixth means comprising:
    means for deciding:
    when Rcal is smaller than or equal to Rs, that the relay should operate, if (Xcal−Xs)/(Rcal−Rs) is smaller than a pre-determined constant, and if the fifth means decides that the relay should operate;
    wherein Rcal is a resistance component calculated by the first means, Rs is a pre-determined resistance component, Xcal is a reactance component calculated by the first means, and Xs is a pre-determined reactance component.

* * * * *